US011028017B2

(12) United States Patent
Friedrich et al.

(10) Patent No.: US 11,028,017 B2
(45) Date of Patent: Jun. 8, 2021

(54) FAST-DRYING SCREED AND SCREED MIXTURE FOR PRODUCING THE SCREED

(71) Applicant: Knauf Gips KG, Iphofen (DE)

(72) Inventors: Sabrina Friedrich, Erlangen (DE); Matthias Büttner, Obernbreit (DE)

(73) Assignee: KNAUF GIPS KG, Iphofen (DE)

( * ) Notice: Subject to any disclaimer, the term of this patent is extended or adjusted under 35 U.S.C. 154(b) by 353 days.

(21) Appl. No.: 15/746,901

(22) PCT Filed: Jul. 23, 2015

(86) PCT No.: PCT/EP2015/001523
§ 371 (c)(1),
(2) Date: Jan. 23, 2018

(87) PCT Pub. No.: WO2017/012631
PCT Pub. Date: Jan. 26, 2017

(65) Prior Publication Data
US 2020/0087208 A1 Mar. 19, 2020

(51) Int. Cl.
*C04B 28/14* (2006.01)
*C04B 14/06* (2006.01)
*C04B 24/04* (2006.01)
*C04B 24/16* (2006.01)
*C04B 24/42* (2006.01)
*C04B 111/00* (2006.01)
*C04B 111/62* (2006.01)

(52) U.S. Cl.
CPC .............. *C04B 28/14* (2013.01); *C04B 14/06* (2013.01); *C04B 24/04* (2013.01); *C04B 24/16* (2013.01); *C04B 24/42* (2013.01); *C04B 2111/00482* (2013.01); *C04B 2111/62* (2013.01)

(58) Field of Classification Search
CPC ......... C04B 14/06; C04B 24/04; C04B 24/16; C04B 24/42; C04B 28/14; C04B 2111/00482; C04B 2111/62
See application file for complete search history.

(56) References Cited

U.S. PATENT DOCUMENTS 3,748,290 A 7/1973 Reingen
5,632,848 A 5/1997 Richards
(Continued)

FOREIGN PATENT DOCUMENTS

CN 101857404 A † 10/2010
CN 102173677 A † 9/2011
(Continued)

OTHER PUBLICATIONS

6001 Chemical Abstracts, Jan. 14, 1985, No. 2, Columbus, OH.
(Continued)

*Primary Examiner* — Anthony J Green
(74) *Attorney, Agent, or Firm* — The Dobrusin Law Firm, P.C.

(57) ABSTRACT

The invention relates to screed mixtures, comprising an inorganic binder, processing additives and drying additives. Self-levelling floor screeds according to the invention can be produced from these screed mixtures, said self-levelling floor screeds drying much more quickly than self-levelling floor screeds with the same composition, but which contain no drying additives.

10 Claims, 5 Drawing Sheets

(56) References Cited

U.S. PATENT DOCUMENTS

| | | | |
|---|---|---|---|
| 6,547,874 B2 * | 4/2003 | Eck | C04B 20/1051 |
| | | | 106/772 |
| 6,632,861 B1 * | 10/2003 | Weitzel | C04B 24/2676 |
| | | | 524/8 |
| 8,974,595 B2 * | 3/2015 | Guyot | C04B 28/02 |
| | | | 106/724 |
| 2013/0284071 A1 * | 10/2013 | Friedel | C04B 28/04 |
| | | | 106/708 |

FOREIGN PATENT DOCUMENTS

| | | | | |
|---|---|---|---|---|
| DE | 1805126 | A1 | | 5/1970 |
| DE | 22 64 075 | A1 | | 7/1974 |
| DE | 2264075 | A1 † | | 7/1974 |
| DE | 3937431 | A1 † | | 5/1991 |
| DE | 4021963 | A1 | | 1/1992 |
| DE | 10061410 | A1 † | | 9/2001 |
| DE | 10061410 | A1 * | 9/2001 | E04F 13/02 |
| DE | 202006016797 | U1 † | | 12/2006 |
| DE | 10 2009 014957 | A1 | | 10/2010 |
| DE | 10 2011 007834 | A1 | | 10/2012 |
| DE | 102011007834 | A1 † | | 10/2012 |
| DE | 102013200121 | A1 † | | 7/2014 |
| EP | 1433768 | A1 † | | 6/2004 |
| EP | 2 090 552 | A2 | | 8/2009 |
| EP | 2 223 903 | A1 | | 9/2010 |
| FR | 2986523 | A1 † | | 8/2013 |
| FR | 2986523 | A1 * | 8/2013 | C04B 28/16 |
| JP | H09255401 | A † | | 9/1997 |
| WO | 99/15475 | A1 † | | 4/1999 |
| WO | 99/48835 | A1 † | | 9/1999 |
| WO | 2004/101464 | A1 | | 11/2004 |
| WO | 2006/130031 | A2 | | 12/2006 |
| WO | 2013/113918 | A1 | | 8/2013 |
| WO | 2014/015289 | A1 | | 1/2014 |

OTHER PUBLICATIONS

European Communication dated Feb. 8, 2019, Application No. 15749984.9.
PCT Search Report & Written Opinion dated Mar. 16, 2016; Application No. PCT/EP2015/001523.
European Communication dated Oct. 9, 2019, Application No. 16732936.6.
European Communication dated Dec. 2, 2019, Application No. 16732936.6.

* cited by examiner
† cited by third party

FAST-DRYING SCREED AND SCREED MIXTURE FOR PRODUCING THE SCREED

The invention relates to a fast-drying mineral screed and a screed mixture for producing such a screed. In particular, the invention relates to a fast-drying mineral self-levelling floor screed, preferably on a calcium sulphate base.

Fast-drying self-levelling floor screeds on cement basis are on offer on the market. A drawback is their high degree of shrinkage and therefore their tendency to crack formation and bulging, which can arise due to one-sided drying. Heating with floor heating is usually permitted after 1.5 to 2 weeks at the earliest.

Further, there are floor screeds based on calcium sulfate as the main binder. The binder of a calcium sulphate screed can comprise calcium sulphate of various hydration stages. Calcium sulphate screeds have a very low degree of shrinkage, so that large areas can be produced seamlessly with them. Calcium sulphate screed normally comprises the constituents calcium sulphate hemihydrate and/or anhydrite, sand or gravel, optionally additives and water. The setting or hardening takes place through crystallisation. Depending on the temperature and climate at the construction site, the screed can usually be walked on after one day and can be subjected to full load after 28 days.

Calcium sulphate screeds are sensitive to moisture and must be able to dry out unhindered. They therefore have to be laid at the earliest after the residual moisture has fallen below a specific content. The maximum residual moisture according to DIN 18560-1:2004-04 for the readiness of unheated screeds for laying amounts to 0.5%, whereas the maximum residual moisture for heated screeds amounts to 0.3%. However, it is common to lay unheated screeds even from 1% if the finishing layers are coverings permeable to vapour such as for example textile or vapour-inhibiting coverings such as for example tiles. According to the existing prior art, the determination of the residual moisture is carried out by means of the Darr method (gravimetric method) according to DIN 1048-5: 1991-06 (but at 40° C. for calcium sulphate-based systems instead of 105° C. for cement-based systems) or by means of the CM measurement according to DIN 18560-4:2012-06 (calcium carbide method).

Calcium sulphate screeds can be processed as a self-levelling floor screed. Self-levelling floor screeds can be constituted structurally differently, for example as composite screed, screed on a separating layer, screed on an insulating layer or as heating screed. Calcium sulphate self-levelling floor screeds (CAF) are wet screeds, to which a flow agent is added for the purpose of self-levelling. After the mixing process, the self-levelling floor screed is pumped in and knocked through with a wobble bar or a bouncing broom to allow air pores to escape and to activate the self-levelling process. The mechanical work steps of distributing, compressing, abrading and smoothing, which are required with manual application of a conventional screed, are unnecessary.

In Germany, specific live loads are required for screeds with a defined screed thickness, for example on account of specific building standards, e.g. standard series DIN 18560. The vertical useful load to be expected (hitherto referred to as the "traffic load") according to DIN 1055-3:2006-03 has to be taken into account in the planning of the screed structure. The following generally applies to these live loads: the thicker the screed, the higher can be the live load to be applied. From the standpoint of the live load, screed thicknesses as great as possible are therefore preferred. With increasing screed thickness, however, the drying time of the screed is also lengthened, which leads to delayed building progress. Especially in the area of prefabricated houses, however, long drying times are undesirable. In the case of a heating screed structure, the heating of the screed accelerates the drying (start of heating/heating profile and flow temperatures according to manufacturer's specification), but nonetheless a shortening of the drying times up to readiness for laying is desirable.

The problem of the invention, therefore, is to provide a screed mixture for producing a screed compound, a screed premixed dry mortar and/or a self-levelling floor screed, wherein the self-levelling floor screed ultimately produced dries faster than self-levelling floor screeds of the same material type known from the prior art. In particular, a calcium sulphate self-levelling floor screed is to be made available which combines the typical calcium sulphate self-levelling floor screed properties such as, for example, good processability, reliability in use, low shrinkage, self-levelling and the possibility of being used as heating screed with a significantly shortened drying time.

The problem is solved by means of a screed mixture and a self-levelling floor screed.

Accordingly, a screed mixture according to the invention comprises an inorganic binder, processing additives and drying additives. The drying additives can comprise capillary drying additives and/or diffusion drying additives.

Various base materials can be used as a binder, calcium sulphate-based and cement-based base materials being preferred. Calcium sulphate-based systems comprising hemihydrate and/or anhydrite are particularly preferred.

It is however also possible to use mixtures of calcium sulphate and cement as a binder. Any mixing ratio is theoretically conceivable. A calcium sulphate-based screed mixture preferably has a fraction of 70 to 100 wt. % calcium sulphate and 0 to 30 wt. % cement, each related to the total binder mass. A cement-based screed mixture, on the other hand, has a fraction of 70 to 100 wt. % cement and 0 to 30 wt. % calcium sulphate, each related to the total binder mass.

A screed mixture as described here can for example be a binder compound, also referred to in the following as a screed compound. A binder compound is understood to mean a mixture of the dry constituents without the additives which still have to be added for a finished screed. Thus, when a binder compound is mixed with the additives, a screed premixed dry mortar results, which when mixed with water produces the screed ready for processing. All these products are combined under the definition of a "screed mixture" used here, depending on the composition.

A screed mixture for a binder compound according to the invention can for example be composed as follows, the total sum adding up to 100 wt. %:
  binder: 71-99 wt. %
  processing additives: 0.0015-13 wt. %
  drying additives: 0.005-16 wt %

A screed mixture for a screed premixed dry mortar according to the invention also contains additives in addition to the aforementioned constituents. Generally known fillers for screed preparations, in each case adapted to the binder used, for example sand and/or limestone etc., can be used as additives.

Preferred compositions of a screed premixed dry mortar according to the invention with a calcium sulphate base are based on' the formulation described below, wherein the total mass adds up to 100 wt. %:
  binder: 15 to 60 wt. %
  additives 35 to 80 wt. % processing additives: 0.001 to 8 wt. %
drying additives, comprising capillary drying additives and/or diffusion drying additives: 0.01 to 10 wt. %

The processing additives of the described screed mixtures comprise all commonly used additives that improve the processability of the screed. In particular, use is made here of liquefiers, alkaline initiators, retarders, crystallization initiators, stabilisers and/or defoamers.

The invention includes both screed premixed dry mortar as well as screed binder compounds based on calcium sulphate or based on cement.

The drying additives according to the invention can comprise capillary drying additives and/or diffusion d.-Ying additives. Within the scope of the invention, drying additives are understood to mean additives which accelerate the drying time of the screed up to the desired readiness for laying. Capillary drying additives are drying additives which assist in the capillary moisture transport in the screed, whilst diffusion drying additives assist the moisture transport by diffusion in the screed. These supported processes lead to faster drying of the screed and consequently to the readiness for laying being reached earlier. An identically constituted self-levelling floor screed, which comprises no drying additives or at any rate not in the dosage indicated as preferred, referred to in the following as a zero sample, serves as a reference or a comparison.

Although the use of the drying additives is described in the following essentially on the basis of examples in respect of self-levelling floor screeds, the drying additives also of course accelerate the drying of so-called conventional screeds introduced earth-damp. The following description should not therefore be regarded as limited to self-levelling floor screeds. Since self-levelling floor screeds require a higher water content for the application on the substrate than conventional screeds, the inventive effects are visible with greater clarity.

Diffusion drying additives are for example hydrophobing agents, pore forming agents, dispersion powders or porous additives, also referred to below simply as "porous additive". The diffusion drying additives can be used individually or in combination with one another. Diffusion drying additives are preferably contained each in a quantity of 0.001 to 10 wt. % related to a screed mixture with additives, i.e. related to the total mass of a screed premixed dry mortar.

Capillary drying additives comprise, for example, hydrophobing agents or dispersion powders. The capillary drying additives can be used individually or in combination with one another. The capillary drying additives each are preferably contained in a quantity of 0.001 to 0.5 wt. % related to a screed mixture with additives, i.e. related to the total mass of a screed premixed dry mortar.

According to a further preferred embodiment of the invention, diffusion drying additives and capillary drying additives are used in combination with one another.

The drying additives can preferably be added individually or in combination with one another in the following quantity ranges, in each case related to the total mass of the screed premixed dry mortar:
hydrophobing agent: 0 to 0.15 wt. %, preferably 0.03 to 0.15 wt. %, particularly preferably 0.03 to 0.08 wt. %,
pore forming agent: 0 to 0.3% wt. %, preferably 0.001 to 0.3 wt. %,
porous additive: 0 to 10.0 wt. %, preferably 0.01 to 10 wt. %,
dispersion powder: 0 to 0.5% wt. %

According to a particularly preferred embodiment of the invention, use is made of hydrophobing agents based on siliconate or siloxane, individually or in combination. In construction chemistry, the term "hydrophobisation" denotes the water-repelling finish of a hydrophilic building material in order to reduce its wettability with water. The water absorption capacity of the building material should therefore be greatly reduced in a moist environment. In several examples of embodiment described here, a mass hydrophobisation (in contrast with the application of a hydrophobing coating on the surface) is carried out by the addition of a hydrophobing agent in the production of the screed premixed dry mortar. It can be shown that the employed small quantity of hydropobing agent leads to a shorter drying time of the screed.

When the hydrophobing agent is used as a drying additive, the hydrophobing agent is not added in the dose that would be required for the hydrophobisation of a screed, but rather in a small concentration. The purpose of this addition precisely does not lie in the hydrophobisation of the entire bulk material. On the contrary: It is obvious to the person skilled in the art that hydrophobing agents in the bulk material of the screed premixed dry mortar tend to slow down the drying of the screed, in particular of a self-levelling floor screed. The task of the hydrophobing agent is usually the hindrance or the prevention of moisture absorption by the material. It must therefore also be assumed that the release of moisture present in the material is hindered.

It was therefore a surprising finding that small quantities of a hydrophobing agent accelerate the drying of screeds. It is assumed that the added small quantities of hydrophobing agent bring about a hydrophobisation of the pore surfaces of the screed, so that both the capillary and also the diffusion-controlled drying are accelerated.

Substances based, for example, on olefin sulphonate or alcohol ethoxylate can be added as pore forming agents. The pore forming agents lead to an increase in the porosity and influence the pore distribution of the screed, so that the diffusion-controlled drying is accelerated.

The addition of porous additives, e.g. based on pumice stone, works in a similar manner. In principle, all possible porous additives are conceivable. Preferably, however, they should have a similar bulk density, colloquially also referred to as bulk weight, to the screed, for example approx. 1.5 kg/l, since they otherwise float in the mixture with water. The porous additives increase the porosity and influence the pore distribution of the screed. The addition of such materials accelerates the diffusion-controlled drying.

Diffusion powders, which can be used within the scope of this invention, comprise for example polyvinyl alcohol and its derivatives and are preferably used in a quantity of 0.001 to 0.5 wt. %.

The additives for the fast drying can be used individually or in combination with one another. The combined use of pore forming agents with a porous additive yields a synergic effect. The drying times achieved with this combination are achieved neither with the sole use of pore forming agents nor with the sole use of a porous additive.

The most rapid drying was achieved with a hydrophobing agent on a siliconate or alkali siliconate base. Compared to an identically composed self-levelling floor screed with the exception of the hydrophobing agent, the drying time was thus reduced by more than 50%. The shortening of the drying time applies both to the readiness for laying of 1% residual moisture and also to the readiness for laying of 0.5% residual moisture.

Accordingly, therefore, the invention also covers a finished self-levelling floor screed which is obtained from a previously described screed compound or a previously described screed premixed dry mortar with the addition of the described additional constituents, i.e. additives and/or water.

The self-levelling floor screed preferably comprises a calcium sulphate-containing or a cement-containing binder and the aforementioned materials, preferably in the aforementioned quantities, as drying additives.

The invention also comprises the use of a hydrophobing agent as a drying additive in chemically setting binder compositions, wherein the chemically setting binder compositions is preferably a screed mixture, a screed compound, a screed premixed dry mortar or a self-levelling floor screed.

BRIEF DESCRIPTION OF THE DRAWINGS

The invention is explained in greater detail below with the aid of examples of embodiment. In the figures.

The determination of the moisture content and the drying profile of the self-levelling floor screed samples took place by means of the Darr method according to DIN 1048-5: 1991-06. The Darr method is the most precise way of determining the moisture content of a sample. The material sample is taken by means of a hammer and chisel over the entire cross-section. The sample material thus obtained is immediately sealed in a vapour-tight container. The sample is size-reduced in the laboratory and weighed in a small dish. The sample in the small dish is then heated in a drying cabinet to 40° C., until the mass of the sample body diminishes by not more than 0.1% in 24 hours. The moisture content as a mass fraction in % results from the mass difference before and after the drying.

$$\frac{M_1 - M_2}{M_2 - M_0} \times 100 = F_{Darr}[\text{wt. \%}]$$

$M_0$ vessel empty
$M_1$ vessel+sample (moist)
$M_2$ vessel+sample (dry)
$F_{darr}$ moisture content The moisture content can alternatively also be determined by the CM measurement according to DIN EN 18560-4: 2012-06.

The bending tensile strength and compressive strength of the self-levelling floor screed were tested according to DIN EN 13892-2:2002.

The tests represented in FIGS. 1 to 5 were carried out with a calcium sulphate-based binder compound. The stated hydrophobing agent fractions relate to the binder compound.

The binder compound was mixed in the laboratory with the provided quantity of 62 wt. % additive. Storage of the samples took place with a constant room climate with a temperature of 20±1° C. and 65±3% relative air humidity.

Figure 1:
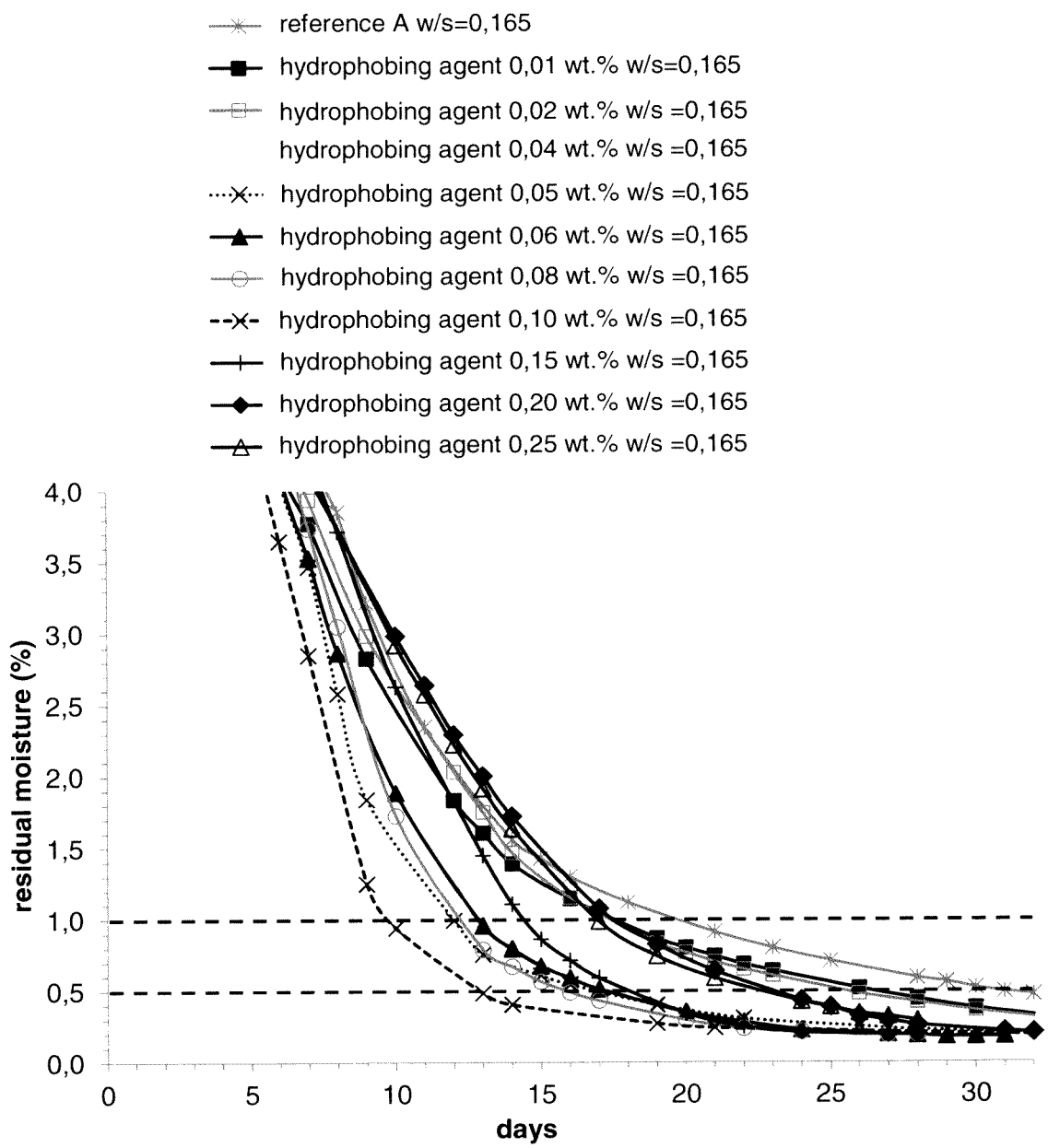
FIG. 1: shows a diagram in which the residual moisture is plotted against the drying time, wherein screed samples with different quantities of hydrophobing agent have been used.
Figure 2:
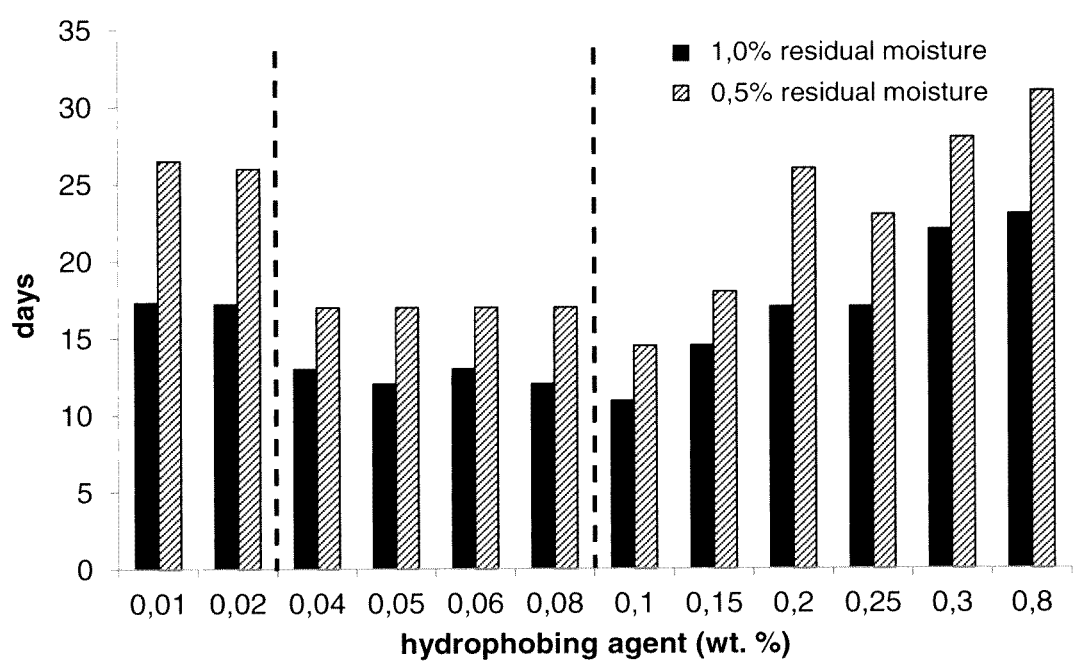
FIG. 2: shows a bar diagram in which, for constant residual moistures of 1 and 0.5%, the content of hydrophobing agent in individual screed samples is plotted against the drying time.

The dependence of the drying time on the hydrophobing agent fraction is represented in FIGS. 1 and 2. A hydrophobing agent on a siliconate base was used. The sample composition was identical in all the screed samples, apart from the varied quantity of hydrophobing agent. The water/solid ratio (w/s) of the screed samples was 0.165.

It can clearly be seen that the drying period is significantly shortened only in a narrow fraction range from 0.03 to 0.15 wt. % hydrophobing agent, see FIG. 2. The use of the hydrophobing agent is limited, moreover, by the falling strength values of the screed from a content of 0.1 wt. %, preferably even 0.08 wt. % hydrophobing agent, see FIG. 3. Calcium sulphate or cement screeds of the strength class of at least C20 F4 according to DIN EN 13813:2002 are normally used in house building.

The sample containing a fraction of 0.1 wt. % hydrophobing agent dries quickest (FIG. 1). Screed samples containing more or less hydrophobing agent require longer to achieve the same residual moisture.

A bar diagram is illustrated in FIG. 2 in which, for the residual moistures 1% and 0.5% of screed samples, the hydrophobing agent concentration is plotted against the drying time (days) that was required to achieve the corresponding residual moisture.

It can clearly be seen that the drying period is significantly shortened only in a narrow fraction range from 0.03 to 0.15 wt. % hydrophobing agent. If lower or higher fractions of hydrophobing agents are used, the drying time is lengthened, in particular to achieve a residual moisture of 0.5%.

Figure 3:
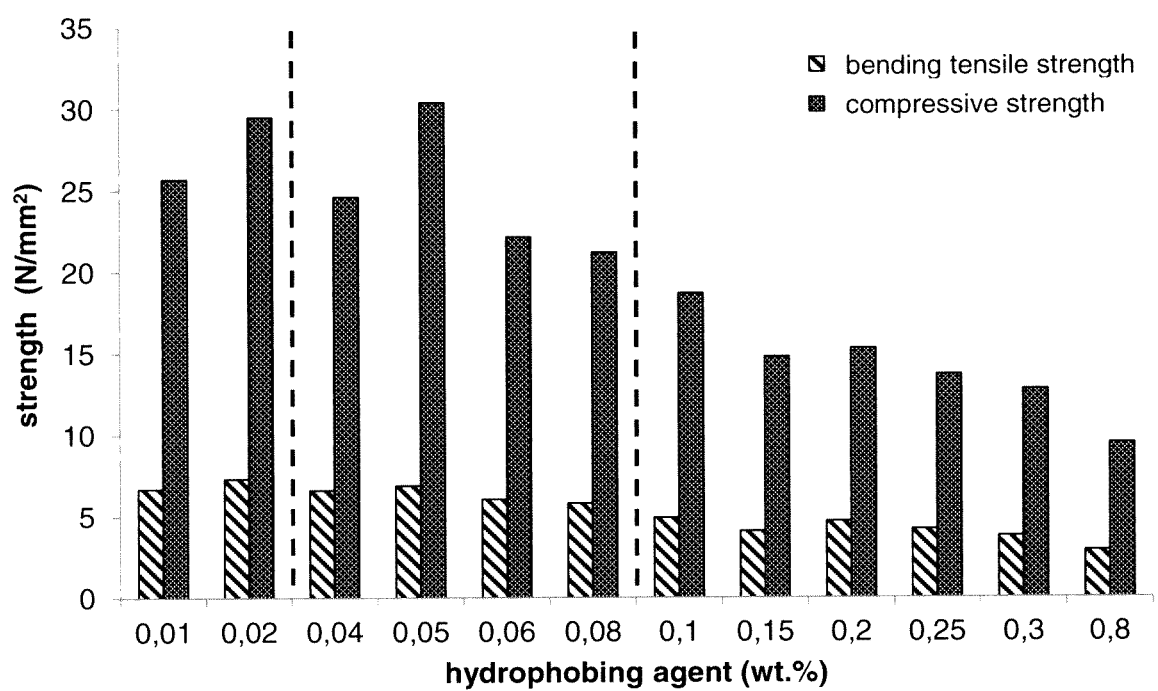
FIG. 3: shows a bar diagram in which the compressive strength and bending tensile strength are plotted against the content of hydrophobing agent in the individual screed samples.

The bar diagram in FIG. 3 shows the compressive strength and the bending tensile strength, determined according to DIN EN 13892-2:2002, of screed samples with different fractions of hydrophobing agent. From a content of approx. 0.05 wt. % hydrophobing agent, in particular the compressive strength of the screed samples consistently diminishes with an increasing content of hydrophobing agent. In the content range from 0.03 to 0.08 wt. % hydrophobing agent, the strengths lie within class C20 F4 according to DIN EN 13813:2002. This fraction range is therefore a particularly preferred range.

With a variation of the formulation, for example of the binder fractions, higher strength classes can of course also be achieved.

The bending tensile strength also diminishes with an increasing hydrophobing agent content. In the range from 0.03 to 0.08 wt. %, values up to 5 N/mm² are however still achieved, which corresponds to a class F5 according to DIN EN 13813.

The preferred range of the fraction of hydrophobing agent between 0.03 and 0.15 wt. % and the particularly preferred range between 0.03 and 0.08 wt. % can be deduced from these investigations. An optimum combination of short drying time and yet sufficient compressive and bending tensile strengths results in these ranges.

Figure 4:
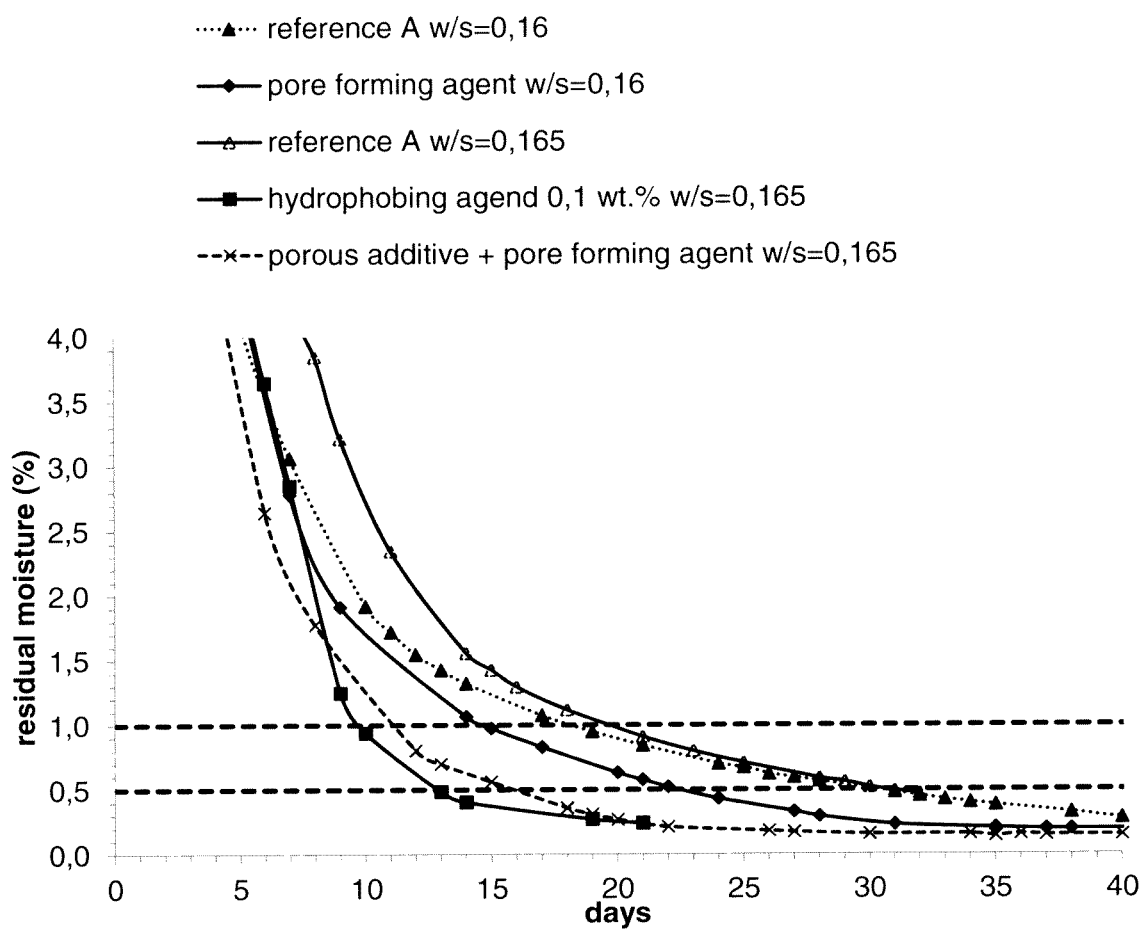
FIG. 4: shows a diagram in which the drying profile for samples with hydrophobing agents, samples with pore forming agents and samples with a combination of a porous additive and pore forming agents are represented by way of comparison.
Figure 5:
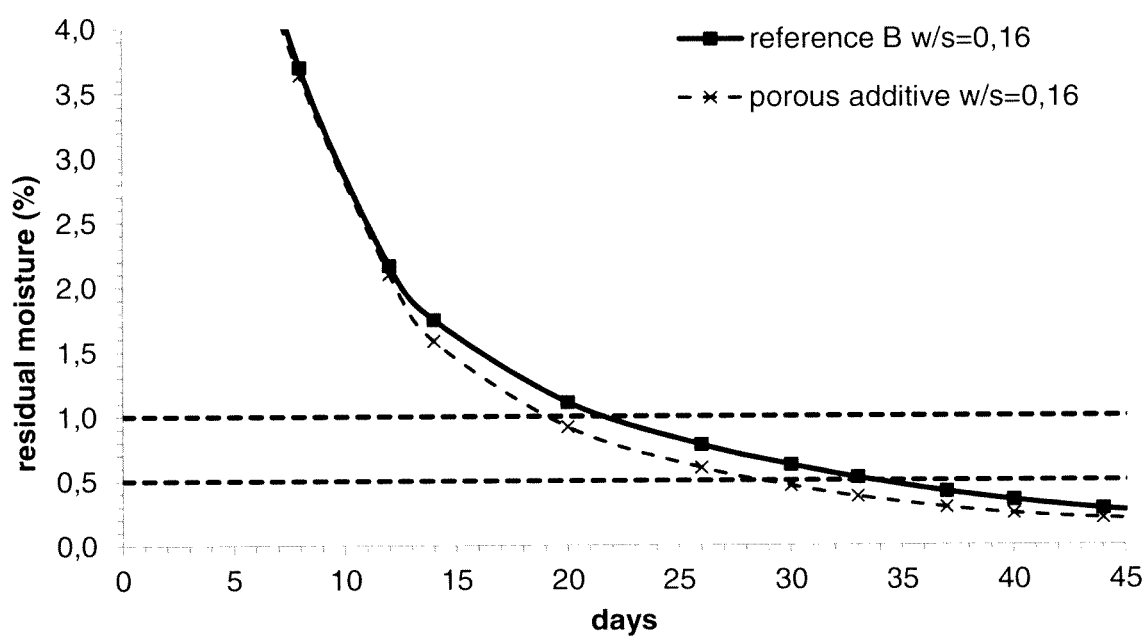
FIG. 5: shows a diagram in which the drying profile for samples with a porous additive and the drying profile of the associated zero sample are represented.

The drying profile for screed samples with hydrophobing agent, screed samples with pore forming agents and for screed samples with a combination of porous additive and pore forming agents is represented in FIG. 4. In each case, a zero sample (reference) for the employed water/solid ratios is also shown. FIG. 5 shows a drying profile for a screed sample, which exclusively contains a porous additive as a drying additive, as well as the associated zero sample.

The tests are based on a binder compound formulation stated by way of example below:

| binder: | alpha-hemihydrate | 97.2 wt. % |
|---|---|---|
| binder: | cement | 2.46 wt. % |
| processing additives | melamine sulphonate, fruit acid | 0.15 wt. % |
| drying additive | siliconate | 0.19 wt. % |

In order to produce a screed, the binder compound is mixed with 59 wt. % quartz sand as an additive.

If only one drying additive is added, a hydrophobing agent is preferably used, since the latter, when used alone, produces the best results with regard to the drying time up to reaching a residual moisture content of 1 and 0.5%, see also table 1. When use is made of 0.1 wt. % hydrophobing agent and a water/solid ratio of 0.165, a residual moisture content of 1% is achieved after 9.5 days and a residual moisture content of 0.5% after 13 days. Associated zero sample A reaches these values after 20 and 30.5 days, respectively. Accordingly, the invention also comprises the use of a hydrophobing agent as a drying additive in setting binder compositions, in particular in screed binder compounds, screed premixed dry mortars or self-levelling floor screeds.

TABLE 1

|  | Drying period [days] | | | |
|---|---|---|---|---|
| Residual moisture content | 1% | 0.5% | 1% | 0.5% |
| Water/solid ratio | 0.165 | 0.165 | 0.16 | 0.16 |
| Zero sample A | 20 | 30.5 | 18 | 30 |
| Pore forming agent |  |  | 14.5 | 22.5 |
| Hydrophobing agent | 9.5 | 13 |  |  |
| Porous additive + pore forming agent | 11 | 16 |  |  |
| Zero sample B |  |  | 21.5 | 33.5 |
| Porous additive |  |  | 19 | 29 |

If only a pore forming agent with a water/solid ratio of 0.16 is added, a residual moisture content of the screed sample of 1% is reached after 14.5 days and of 0.5% after 22.5 days. Associated zero sample A reaches the residual moisture value of 1% after 18 days, the value of 0.5% only after 30 days.

If only a porous additive is used as a drying additive, see FIG. 5, the screed sample reaches a residual moisture content of 1% after 19 days and a residual moisture content of 0.5% after 29 days. Zero sample B for a water/solid ratio of 0.16 reaches the corresponding values after 21.5 and respectively 33.5 days.

The different drying periods of zero samples A and B result from the different binder fractions. Zero sample A contains a higher fraction of binder.

As represented in FIG. 4, it emerges, completely surprisingly, that a combination of pore forming agents and porous additive in a screed sample leads to markedly shortened drying times. A residual moisture value of 1% was reached after 11 days, a residual moisture value of 0.5% even being reached after only 16 days. For comparison, the values of zero sample A: residual moisture content 1% after 20 days, residual moisture content of 0.5% after 30.5 days. This result was surprising, because with a single addition of pore forming agents or porous additive faster drying is achieved compared to the respective zero sample, but the time-saving is comparatively small. If, on the other hand, a combination of these two drying additives is added, the drying time is shortened significantly and to a much greater extent than with the addition of only one of these two drying additives.

The invention claimed is:

1. A screed mixture, comprising an inorganic binder, processing additives for improving processability of the screed, and drying additives, wherein the drying additives are selected from hydrophobing agents, or wherein the drying additives are selected from a mixture of hydrophobing agents and pore forming agents, or a mixture of hydrophobing agents and porous additives, or a mixture of hydrophobing agents, pore forming agents and porous additives, wherein the hydrophobing agent is contained in a quantity of 0.03 to 0.15 wt. % related to the total mass of the screed mixture, or wherein the drying additives are selected from a mixture of pore forming agents and porous additives, wherein the pore forming agent and the porous additive are each contained in a quantity of 0.001 to 10 wt. % related to the total mass of the screed mixture.

2. The screed mixture according to claim 1, wherein the inorganic binder is a calcium sulphate-containing binder or a cement-containing binder.

3. The screed mixture according to claim 1, wherein the screed mixture also contains fillers.

4. The screed mixture according to claim 1, wherein the hydrophobing agent is contained in a quantity of 0.03 to 0.08 wt. % related to the total mass of the screed mixture.

5. The screed mixture according to claim 1, wherein said processing additives are selected from the group consisting of liquefiers, alkaline initiators, retarders, crystalline initiators, stabilisers and defoamers.

6. A self-levelling floor screed, comprising an inorganic binder, fillers, processing additives for improving processability of the screed, and drying additives, wherein the drying additives are selected from hydrophobing agents, or wherein the drying additives are selected from a mixture of hydrophobing agents and pore forming agents, or a mixture of hydrophobing agents and porous additives, or a mixture of hydrophobing agents, pore forming agents and porous additives, wherein the hydrophobing agent is contained in a quantity of 0.03 to 0.15 wt. % related to the total mass of the screed mixture, and/or the drying additives are selected from a mixture of pore forming agents and porous additives, wherein the pore forming agent and the porous additive are each contained in a quantity of 0.001 to 10 wt. % related to the total mass of the screed mixture.

7. The self-levelling floor screed according to claim 6, wherein the binder is a calcium sulphate-containing or a cement-containing binder.

8. The self-levelling floor screed according to claim 6, wherein said processing additives are selected from the group consisting of liquefiers, alkaline initiators, retarders, crystalline initiators, stabilisers and defoamers.

9. A method including the use of a hydrophobing agent as a drying additive, the method including a step of adding the hydrophobing agent to a chemically setting binder composition in a quantity of 0.03 to 0.15 wt. % related to the total mass of the composition.

10. The method according to claim 9, wherein the chemically setting binder composition is a screed mixture, a screed compound, a screed premixed dry mortar or a self-levelling floor screed.

* * * * *